US010809565B2

(12) United States Patent
Tan et al.

(10) Patent No.: US 10,809,565 B2
(45) Date of Patent: Oct. 20, 2020

(54) BACKLIGHT MODULE AND DISPLAY DEVICE

(71) Applicants:CHONGQING BOE OPTOELECTRONICS TECHNOLOGY CO., LTD., Chongqing (CN); BOE TECHNOLOGY GROUP CO., LTD., Beijing (CN)

(72) Inventors: Sen Tan, Beijing (CN); Sijun Lei, Beijing (CN); Liang Gao, Beijing (CN); Yansheng Sun, Beijing (CN); Hebing Ma, Beijing (CN); Wei Fu, Beijing (CN); Wencheng Luo, Beijing (CN); Qihai Du, Beijing (CN); Yuxu Geng, Beijing (CN); Qiangsheng Han, Beijing (CN); Song Liu, Beijing (CN)

(73) Assignees: Chongqing BOE Optoelectronics Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/343,367

(22) PCT Filed: Aug. 2, 2018

(86) PCT No.: PCT/CN2018/098367
§ 371 (c)(1),
(2) Date: Apr. 18, 2019

(87) PCT Pub. No.: WO2019/042074
PCT Pub. Date: Mar. 7, 2019

(65) Prior Publication Data
US 2019/0317365 A1 Oct. 17, 2019

(30) Foreign Application Priority Data

Sep. 1, 2017 (CN) .................. 2017 2 1112900 U

(51) Int. Cl.
*G02F 1/03* (2006.01)
*G02F 1/13357* (2006.01)
(Continued)

(52) U.S. Cl.
CPC .. *G02F 1/133603* (2013.01); *G02F 1/133308* (2013.01); *G02F 1/133524* (2013.01)

(58) Field of Classification Search
CPC .................................................... G02B 6/0021
See application file for complete search history.

(56) References Cited

U.S. PATENT DOCUMENTS

2005/0068473 A1* 3/2005 Kim ................... G02B 6/0018
349/65
2007/0035842 A1* 2/2007 Suh ................... G02B 6/0021
359/599

(Continued)

FOREIGN PATENT DOCUMENTS

| CN | 104832842 A | 8/2015 |
| CN | 105042515 A | 11/2015 |

(Continued)

OTHER PUBLICATIONS

International Search Report and Written Opinion issued in International Patent No. PCT/CN2018/098367, dated Oct. 11, 2018, with English translation.

*Primary Examiner* — Joseph L Williams
*Assistant Examiner* — Jacob R Stern
(74) *Attorney, Agent, or Firm* — McDermott Will & Emery LLP

(57) ABSTRACT

A backlight module includes: light sources; a light guide plate disposed at a side of the light sources, the light guide plate including a second light guide portion disposed adjacent to the light sources and a first light guide portion disposed on a side of the second light portion away from the (Continued)

light sources, a thickness of the second light guide portion being greater than a thickness of the first light guide portion; and a back plate including a first back plate portion disposed at a side of the light sources away from the light guide plate and a second back plate portion disposed at a side of the light guide plate which is opposite to a light exit side of the light guide plate.

17 Claims, 2 Drawing Sheets

(51) Int. Cl.
*G02F 1/1333* (2006.01)
*G02F 1/1335* (2006.01)

(56) References Cited

U.S. PATENT DOCUMENTS

| | | | |
|---|---|---|---|
| 2007/0091639 A1* | 4/2007 | Yoo | G02B 6/0021 |
| | | | 362/612 |
| 2008/0049446 A1* | 2/2008 | Harbers | G02B 6/0073 |
| | | | 362/612 |
| 2013/0051069 A1* | 2/2013 | Moon | G02F 1/133615 |
| | | | 362/608 |

FOREIGN PATENT DOCUMENTS

| | | |
|---|---|---|
| CN | 207366884 U | 5/2018 |
| JP | H10-268271 A | 10/1998 |

* cited by examiner

BACKLIGHT MODULE AND DISPLAY DEVICE

CROSS-REFERENCE OF RELATED APPLICATIONS

This application is a national phase entry under 35 USC 371 of International Patent Application No. PCT/CN2018/098367 filed on Aug. 2, 2018, which claims priority to Chinese Patent Application No. 201721112900.0, filed with the Chinese Patent Office on Sep. 1, 2017, titled "BACKLIGHT MODULE AND DISPLAY DEVICE", which are incorporated herein by reference in their entirety.

TECHNICAL FIELD

The present disclosure relates to the field of display technologies, and in particular, to a backlight module and a display apparatus.

BACKGROUND

At present, people are increasingly favoring ultra-thin liquid crystal displays having low power consumptions, and thus requirements for power consumption and a thickness design of liquid crystal displays are also increasing.

A backlight module is an essential part of the liquid crystal display. In a conventional design of a structure of a backlight module, in order to realize an ultra-thinning of the backlight module, a back plate is usually hollowed out, and a reflective sheet is embedded in a hollowed-out area of the back plate, thereby reducing a thickness of a display module.

SUMMARY

Some embodiments of the present disclosure provides a backlight module, and the backlight module includes a light guide plate, a back plate and light sources. The back plate includes a first back plate portion disposed at a side of the light sources away from the light guide plate and a second back plate portion disposed at a side of the light guide plate which is opposite to a light exit side of the light guide plate. The light guide plate is disposed at a side of the light sources, and the light guide plate includes a second light guide portion disposed adjacent to the light sources and a first light guide portion disposed on a side of the second light portion away from the light sources. A thickness of the second light guide portion is greater than a thickness of the first light guide portion.

In some embodiments, the backlight module further includes optical film layers, and the optical film layers are disposed on a surface of the first light guide portion away from the second back plate portion.

In some embodiments a surface of the first light guide portion adjacent to the second back plate portion is flush with a surface of the second light guide portion adjacent to the second back plate portion, and a distance from a surface of the first light guide portion away from the second back plate portion to the surface of the first light guide portion adjacent to the second back plate portion is less than a distance from a surface of the second light guide portion away from the second back plate portion to the surface of the second light guide portion adjacent to the second back plate portion. A thickness of the optical film layers is less than a distance between the surface of the first light guide portion away from the second back plate portion and the surface of the second light guide portion away from the second back plate portion along a thickness direction of the light guide plate.

In some embodiments, a difference value between the thickness of the first light guide portion and the thickness of the second light guide portion ranges from 0.05 mm to 0.1 mm.

In some embodiments, the thickness of the second light guide portion is greater than a thickness of each light source.

In some embodiments, the backlight module further includes a plurality of protruding portions extending externally from a surface of the second light guide portion adjacent to the light sources. The light sources include a plurality of light-emitting units, and each light-emitting unit is disposed between two adjacent protruding portions.

In some embodiments, a length of each protruding portion along a direction from the first light guide portion to the second light guide portion is greater than a length of a corresponding light-emitting unit along a direction from the first light guide portion to the second light guide portion.

In some embodiments, the second light guide portion is a plurality of protruding portions extending from the first light guide portion; and the light sources are disposed at a light incident side of the second light guide portion and disposed among the plurality of protruding portions as the second light guide portion.

In some embodiments, a thickness of each protruding portion is greater than a thickness of each light source.

In some embodiments, a thickness of each protruding portion is equal to a thickness of the second guide portion.

In some embodiments, a difference value between the thickness of the second light guide portion and the thickness of each light source ranges from 0.05 mm to 0.1 mm.

In some embodiments, the backlight module further includes a light-shielding strip disposed at the a light exit side of the second light guide portion.

In some embodiments, the light-shielding strip covers the second light guide portion and the light source.

In some embodiments, the backlight module further includes a circuit board disposed between the second back plate portion, and all of the second light guide portion and the light sources.

In some embodiments, the backlight module further includes a reflective sheet disposed between the first light guide portion and the second back plate portion.

In some embodiments, the backlight module further includes a fixing tape disposed between the circuit board and the reflective sheet. The fixing tape is connected to the second back plate portion.

In some embodiments, the fixing tape includes a portion disposed between the circuit board and the light guide plate at an edge of the circuit board adjacent to the reflective sheet, a portion between the circuit board and the reflective sheet, and a portion between the second back plate portion and the reflective sheet.

In some embodiments, embodiments of the present disclosure further provides a display apparatus, and the display apparatus includes a display module and the backlight module described above.

In some embodiments, the display module is partially disposed at a side of the second light guide portion away from the second back plate portion, and includes an array substrate disposed at a side of the second light guide portion away from the second back plate portion, and a color film substrate disposed on a side of the array substrate away from the array substrate. The display apparatus further includes: a first polarizer disposed on a surface of the color film substrate away from the array substrate, and an orthographic projection of the first polarizer on the second back plate portion is overlapped with an orthographic projection of the first light guide portion on the second back plate portion; a second polarizer disposed on a surface of the array substrate away from the array substrate, and an orthographic projection of the second polarizer on the second back plate portion is overlapped with an orthographic projection of the optical film layers on the second back plate portion.

In some embodiments, the backlight module further includes a light-shielding strip disposed on surfaces of all of the second light guide portion and the light sources away from the second back plate, and the display module is disposed on a surface of the light-shielding strip away from the second light guide portion.

BRIEF DESCRIPTION OF THE DRAWINGS

In order to describe technical solutions in embodiments of the present disclosure more clearly, the accompanying drawings to be used in the description of embodiments or in the prior art will be introduced briefly. Obviously, the accompanying drawings to be described below are merely some embodiments of the present disclosure, and a person of ordinary skill in the art can obtain other drawings according to these drawings without paying any creative effort.

DETAILED DESCRIPTION

Figure 1A:
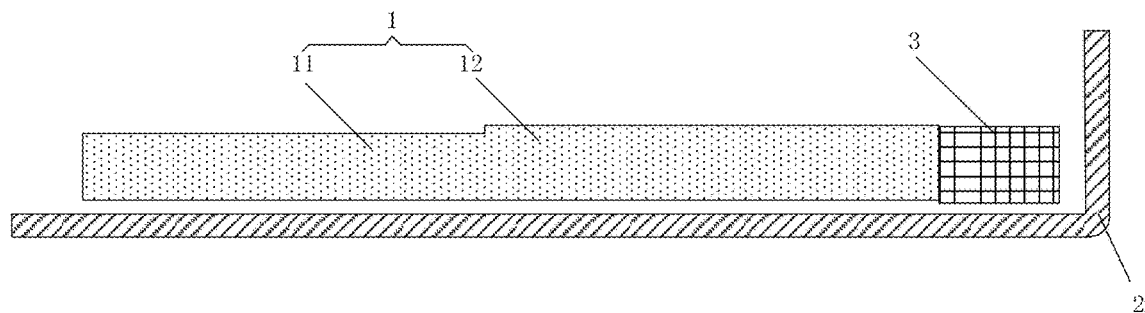
FIG. 1(a) is a schematic diagram showing a structure of a backlight module in accordance with some embodiments of the present disclosure.

The technical solutions in embodiments of the present disclosure will be described clearly and completely with reference to the accompanying drawings in embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

In the description of the present disclosure, it will be understood that orientations or positional relationships indicated by terms "center", "upper", "lower", "front", "rear", "left", "right", "vertical", "horizontal", "top", "bottom", "inner", "outer", etc. are based on orientations or positional relationships shown in the drawings, which merely to facilitate and simplify the description of some embodiments of the present disclosure, but not to indicate or imply that the referred devices or elements must have a particular orientation, or must be constructed or operated in a particular orientation. Therefore, they should not be construed as limitations to the present disclosure.

The terms "first" and "second" are used for descriptive purposes only and are not to be construed as indicating or implying the relative importance or implicitly indicating the number of indicated technical features. Thus, features defined as "first", "second" may explicitly or implicitly include one or more of the features. In the description of the present disclosure, "a plurality of" means two or more unless otherwise specified.

In order to enable a person skilled in the art to better understand technical solutions of the present disclosure, a backlight module and a display apparatus provided by the present disclosure are described in detail below with reference to the accompanying drawings.

Referring to FIG. 1(a), some embodiments of the present disclosure provide a backlight module, and the backlight module includes a light guide plate (abbreviated as LGP) 1, a back plate 2, and light sources 3. The light sources 3 are disposed at a light incident side of the LGP 1. The back plate 2 is disposed at a side opposite to a light exit side of the LGP 1 (a lower side of the LGP 1 in FIG. 1(a)) and a side of the light sources 3 away from the LGP 1. The LGP 1 includes a second light guide portion 12 adjacent to the light sources 3 and a first light guide portion 11 away from the light sources 3. A thickness d2 of the second light guide portion 12 is greater than a thickness d1 of the first light guide portion 11. In practical applications, the second light guide portion 12 may play a role in supporting a display module, thereby ensuring a structural strength of an entire display apparatus. Thus, at a side where the light sources 3 are disposed, there is no need for the back plate to adopt a U-shaped structural design, so that a thickness of the entire display apparatus may be reduced.

Figure 1B:
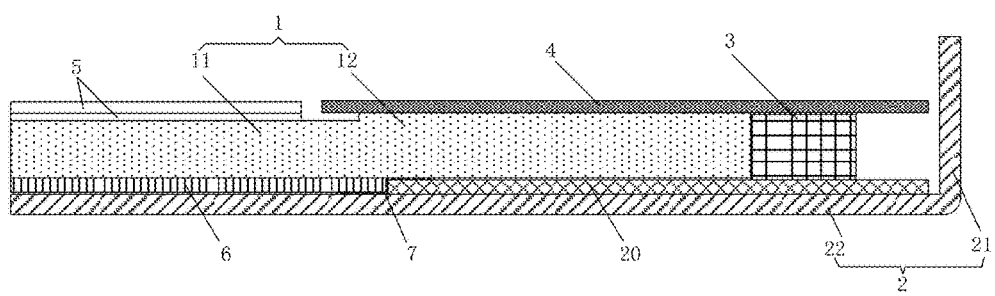
FIG. 1(b) is a schematic diagram showing a structure of another backlight module in accordance with some embodiments of the present disclosure.
Figure 2:
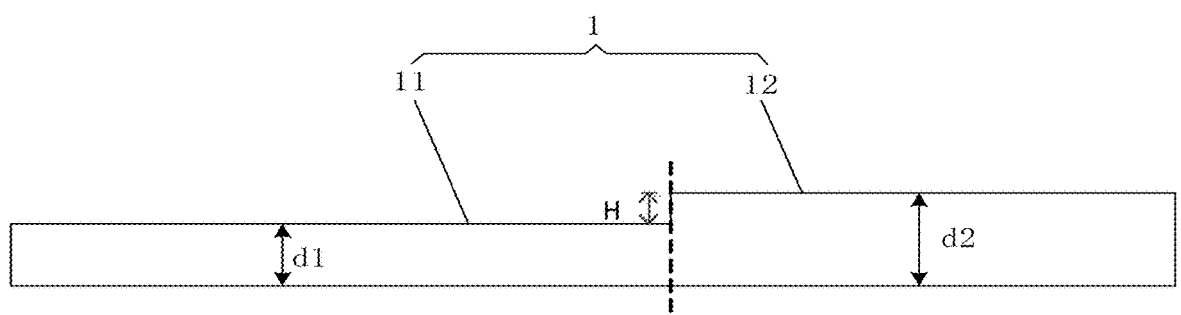
FIG. 2 is a schematic diagram showing a structure of the light guide plate in FIG. 1(b)
Figure 3:
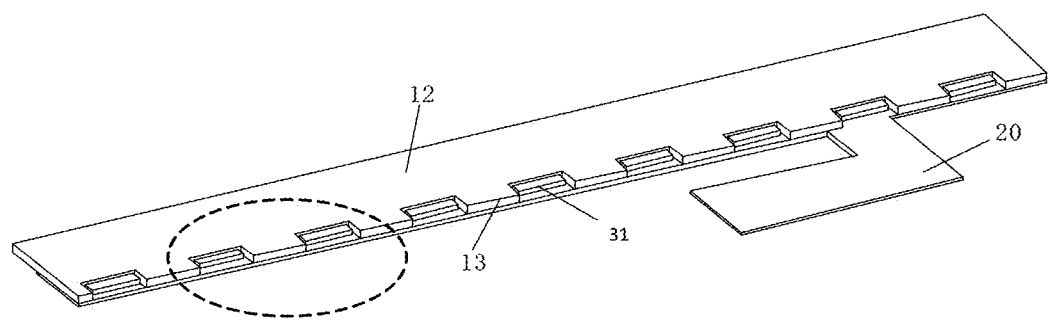
FIG. 3 is a schematic diagram showing a positional relationship between the light source and the light guide plate in FIG. 1(b)
Figure 4:
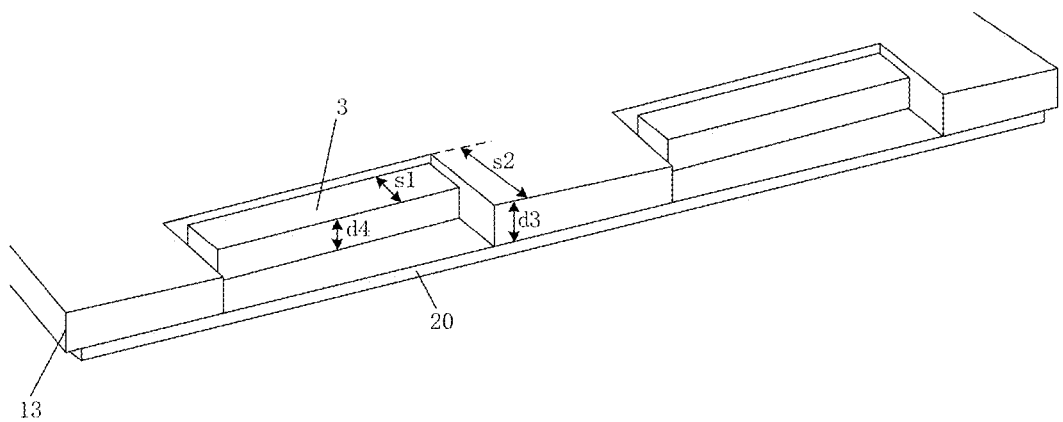
FIG. 4 is an enlarged schematic diagram of a part of FIG. 3.

FIG. 1(b) is a schematic diagram showing a structure of another backlight module provided by some embodiments of the present disclosure. FIG. 2 is a schematic diagram showing a structure of the light guide plate in FIG. 1(b). FIG. 3 is a schematic diagram showing a positional relationship between the light source and the light guide plate in FIG. 1(b). FIG. 4 is an enlarged schematic diagram of a part of FIG. 3. As shown in FIGS. 1(b)-4, the backlight module includes a LGP 1, a back plate 2, light sources 3 and optical films (i.e., optical film layers 5 and a reflective sheet 6). The light sources 3 are disposed at a light incident side of the LGP 1. The back plate 2 is disposed at another side of the LGP 1 opposite to a light exit side of the LGP 1 (a lower side of the LGP 1 in FIG. 1(b)) and a side surface of the LGP 1, i.e., an edge of the back plate 2 is L-shaped. The LGP 1 includes a second light guide portion 12 adjacent to the light sources 3 and a first light guide portion 11 away from the light sources 3. A thickness d2 of the second light guide portion 12 is greater than a thickness d1 of the first light guide portion 11.

A portion of the LGP 1 that is on a right side of a dotted line in FIG. 2 indicates the second light guide portion 12, and a portion of the LGP 1 that is on a left side of the dotted line indicates the first light guide portion 11. The thickness of the first light guide portion 11 is represented by d1, and the thickness of the second light guide portion 12 is represented by d2.

In some embodiments of the present disclosure, a difference value between the thickness d2 of the second light guide portion 12 and the thickness d1 of the first light guide portion 11 ranges from 0.05 mm to 0.1 mm.

In some embodiments of the present disclosure, the difference value between the thickness d2 of the second light guide portion 12 and the thickness d1 of the first light guide portion 11 is 0.1 mm.

In some embodiments of the present disclosure, the thickness d2 of the second light guide portion 12 is 0.65 mm, and the thickness d1 of the first light guide portion 11 is 0.55 mm.

In some embodiments of the present disclosure, the difference value between the thickness d2 of the second light guide portion 12 and the thickness d1 of the first light guide portion 11 ranges from about 0.05 mm to about 0.1 mm. For example, the difference value between the thickness d2 of the second light guide portion 12 and the thickness d1 of the first light guide portion 11 is about 0.05 mm, about 0.06 mm, about 0.07 mm, about 0.08 mm, or about 0.1 mm.

In some embodiments of the present disclosure, as shown in FIGS. 1(b)-4, the backlight module further includes optical film layers 5 (or optical films). The optical film layers 5 are disposed on the first light guide portion 11. In practical applications, the number and a type of the optical film layers 5 may be set according to requirements for designs of products, and are not listed one by one here. For example, the optical film layers 5 include but not limited to a diffusion sheet/layer, a prism sheet/layer, a reflective polarizer/polarizing layer, a reflective sheet/layer and the like.

In some embodiments of the present disclosure, as shown in FIGS. 1(b)-4, a light exit surface of the first light guide portion 11 is higher than a light exit surface of the second light guide portion 12, a distance from the light exit surface of the light guide portion 11 to the light exit surface of the second light guide portion 12 is H, and a thickness of the optical film layers 5 is not greater than H. Thus, the optical film layers 5 do not occupy a thickness space of the backlight module, which facilitates to reduce the thickness of the entire display apparatus.

In some embodiments of the present disclosure, the backlight module further includes optical film layers 5 and a reflective sheet 6. The optical film layers 5 are disposed at a light exit side of the first light guide portion 11, and the reflective sheet 6 is disposed at another side of the first light guide portion 11 opposite to the light exit side of the first light guide portion 11. A plurality of optical film layers 5 may be provided. FIG. 1(b) is illustrated by taking two optical film layers 5 as an example. One of the two optical film layers 5 is a diffusion sheet, and another one of the two optical film layers 5 is a two-in-one ultra-thin prism sheet disposed on the diffusion sheet.

As shown in FIG. 1(b), in some embodiments of the present disclosure, the back plate 2 includes a first back plate portion 21 disposed at a side of the light sources 3 away from the light guide plate 1 and a second back plate portion 22 disposed at a side opposite to the light exit side of the light guide plate 1.

As shown in FIG. 1 (b), if the light incident side of the light guide plate 1 is a right side of the light guide plate 1 shown in FIG. 1(b), the light exit side of the light guide plate 1 is an upper side of the light guide plate 1 shown in FIG. 1(b), another side of the light guide plate 1 opposite to the light exit side of the light guide plate 1 is a lower side of the light guide plate 1 shown in FIG. 1(b), and a side of the light sources 3 away from the light guide plate 1 is a right side of the light sources 3 as shown in FIG. 1(b).

In some other embodiments of the present disclosure, the thickness of the second light guide portion 12 is greater than a thickness of the light sources 3. For example, a difference value between the thickness of the second light guide portion 12 and the thickness of the light sources 3 ranges from 0.05 mm to 0.1 mm. In this way, when the display module is squeezed by an external force, the light sources 3 may be protected against being damaged due to pressure.

In still other embodiments of the present disclosure, the difference value between the thickness of the second light guide portion 12 and the thickness of the light sources 3 ranges from about 0.05 mm to about 0.1 mm.

In some embodiments of the present disclosure, as shown in FIGS. 1(b)-4, a light incident side of the second light guide portion 12 is provided with a plurality of protruding portions 13 extending outward, and the light sources 3 include a plurality of light-emitting units 31. Each light-emitting unit 31 of the plurality of light-emitting units 31 is disposed between two adjacent protruding portions 13. The protruding portions 13, for example, may be integrally formed with the second light guide portion 12. The protruding portions 13 may have a protruding structure extending outward from the second light guide portion 12. In some embodiments, a thickness of each protruding portion 13 is equal to the thickness of the second light guide portion 12.

In some embodiments of the present disclosure, the second light guide portion 12 itself is formed as a plurality of protruding structures extending from the first light guide portion 11, and the light sources 3 may also be disposed at a light incident side of the first light guide portion 11 and disposed among the plurality of protruding structures of the second light guide portion 12.

Since the thickness of the second light guide portion 12 is greater than the thickness of the first light guide portion 11, in practical applications, the second light guide portion 12 may play a role in supporting the display module, thereby ensuring the structural strength of the display apparatus. On the other hand, each light-emitting unit 31 is located between two adjacent protruding portions 13, that is, each protruding portion 13 is filled between two adjacent light-emitting units 31, thereby ensuring a light-entry effect of the light guide plate 1, effectively preventing a hotspot phenomenon due to a too small ratio of A to P of the light source 3, and protecting the light sources 3 from being squeezed and damaged by the external force. A refers to a distance between a side surface (a light-emitting surface) of the light source adjacent to the light guide plate and an edge of a display area (an AA area), and P refers to a distance between the light sources.

In some embodiments of the present disclosure, as shown in FIG. 4, a protruding length s2 of a protruding portion 13 is greater than a length s1 of the light sources 3 along the protruding portion 13. In this way, it is possible to protect the light sources 3 against being easily damaged by being squeezed by the external force.

In some embodiments of the present disclosure, as shown in FIG. 4, a thickness d3 of each protruding portion 13 is greater than a thickness d4 of the light sources 3. In this way, it is possible to protect the light sources 3 against being easily damaged by being squeezed by the external force.

In some embodiments of the present disclosure, as shown in FIG. 1(b), the light exit side of the second light guide portion 12 is provided with a light-shielding strip. When the backlight module is applied into the display apparatus, the display module of the display apparatus may be partially disposed on the light-shielding strip 4. For example, as shown in FIG. 1(b), the display module of the display apparatus may include a color film substrate and an array substrate disposed opposite to each other. The array substrate is partially disposed on the light-shielding strip 4. In some embodiments of the present disclosure, the second light guide portion 12 and the light sources 3 are covered by the light-shielding strip 4. A light-shielding function of a U-shaped back plate may be realized through the light-shielding strip 4.

In some embodiments of the present disclosure, the light sources 3 are disposed on a circuit board 20, and the circuit board 20 is disposed at a side opposite to the light exit side of the light guide plate 1. A plurality of light-emitting units 31 of the light sources 3 may be provided, and the plurality of light-emitting units 31 are disposed on the circuit board 20. The circuit board 20 is disposed at another side of the light guide plate 1 opposite to the light exit side of the light guide plate 1. In some embodiments of the present disclosure, as shown in FIG. 1(b), the circuit board 20 is disposed between the second light guide portion 12 and the second back plate portion 22. In some embodiments of the present disclosure, the circuit board 20 is a flexible printed circuit (abbreviated as FPC).

In some embodiments of the present disclosure, the backlight module further includes a first fixing tape 7 for fixing the circuit board 20 to the back plate 2, thereby fixing the light sources 3 to the back plate 2. One end of the first fixing tape 7 is disposed on an edge of the circuit board 20, and another end of the first fixing tape 7 is disposed on the back plate 2, thereby fixing the light sources 3 to the back plate 2.

In some embodiments of the present disclosure, the backlight module further includes a reflective sheet 6 disposed between the first light guide portion 11 and the back plate 2.

In some embodiments, the first fixing tape 7 extends along an edge of a side of the circuit board 20 adjacent to the light guide plate 1, a side surface of the circuit board 20 adjacent to the reflective sheet 6 and a side of the back plate 2 adjacent to the reflective sheet 6, so as to fix both the circuit board 20 and the reflective sheet 6 to the back plate 2.

In some embodiments of the present disclosure, the light sources 3 are a light-emitting diodes (LED). For example, the light sources 3 are 3806 LEDs.

When the backlight module is applied into the display apparatus, the backlight module provided by the embodiments may reduce the thickness of the entire display apparatus under a premise of satisfying requirements for a high luminance and a low power consumption of users, for example, the backlight module provided by the embodiments may reduce the thickness of the entire display apparatus to only 1.819 mm, whereas a thinnest thickness of a display apparatus in the prior art is generally only 1.899 mm. The thickness of the backlight module provided by the embodiments is further reduced, so that the thickness of the entire display device may be reduced. A difference between a design thickness of the display apparatus and a standard thickness of the display apparatus is large, and thus the thickness of the display apparatus produced is not easy to exceed a specification (Spec).

In the backlight module provided by the embodiments, the thickness of the second light guide portion is greater than the thickness of the first light guide portion, and thus the optical films or optical film layers may be mounted by utilizing the difference value between the thickness of the first light guide portion and the thickness of the second light guide portion, so as to enable an overall thickness after mounting the optical films or the optical film layers not to exceed the thickness of the second light guide portion. The thickness of the second light guide portion is increased, and in practical applications, the second light guide portion may be configured to support the display module, and thus the back plate may be disposed only at another side of the light guide plate opposite to the light exit side of the light guide plate and a side of the light sources away from the the light guide portion. That is, there is no need for the back plate to adopt a U-shaped structural design, which enables the thickness of the backlight module to be reduced. Thereby, the thickness of the display apparatus is reduced and a risk that the thickness of the display apparatus exceeds the spec is decreased. On the other hand, if the back plate does not adopt the U-shaped structural design, an assembly space may be expanded, so that an assembly of the backlight module is more convenient, thereby improving an assembly efficiency and a yield of the backlight module.

In some embodiments of the present disclosure, the light incident side of the second light guide portion is provided with protruding portions, and each light source is disposed between two adjacent protruding portions, that is, each protruding portion is filled between two adjacent light sources, thereby ensuring a light-entry effect of the light guide plate 1, effectively preventing a hotspot phenomenon due to a too small ratio of A to P of the light source 3, and protecting the light sources 3 from being squeezed and damaged by the external force.

Figure 5:
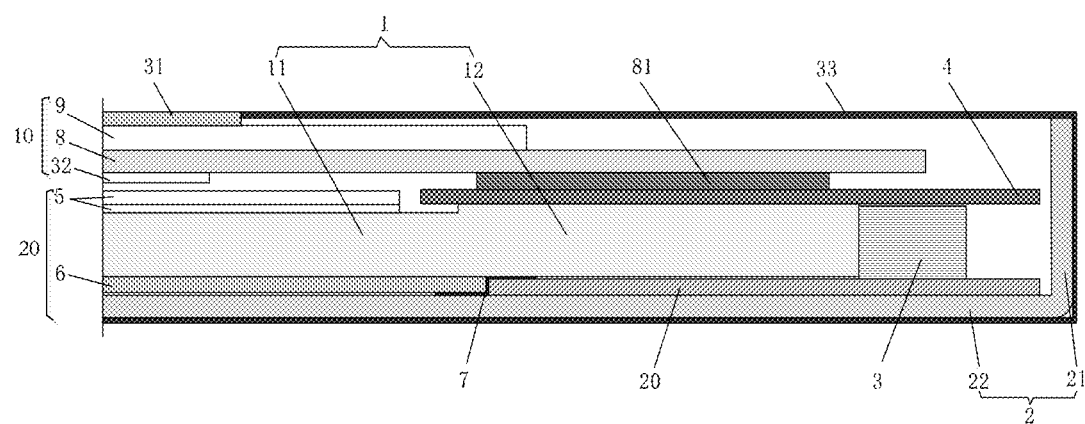
FIG. 5 is a schematic diagram showing a structure of a display apparatus in accordance with some embodiments of the present disclosure.

FIG. 5 is a schematic diagram showing a structure of a display apparatus provided by some embodiments of the present disclosure. As shown in FIG. 5, the display apparatus includes a display module 10 and the backlight module 20 provided by the above embodiments.

As shown in FIG. 5, the display module 10 includes an array substrate 8 and a color film substrate 9 disposed opposite to each other. The array substrate 8 is disposed at the light exit side of the light guide plate 1. The color film substrate 9 is disposed at a side of the array substrate away from the light guide plate 1 and disposed above the first light guide portion 11. A projection of the color filter substrate 9 on the array substrate 8 and a projection of the second light guide portion 12 on the array substrate 8 are partially overlapped.

The display module 10 may be partially disposed on the light-shielding strip 4. For example, as shown in FIG. 5, the array substrate 8 is partially disposed on the light-shielding strip 4.

In some embodiments of the present disclosure, the display module 10 further includes a second fixing tape 81 disposed between the array substrate 8 and the light-shielding strip 4. A portion of the array substrate 8 is fixed to the light-shielding strip 4 by the second fixing tape 81.

In some embodiments of the present disclosure, the display module 10 further includes a first polarizer 31 and a second polarizer 32. The first polarizer 31 is disposed at a side of the color film substrate 9 away from the array substrate 8 and disposed above the first light guide portion 11. The second polarizer 32 is disposed at a side of the array substrate 8 close to the light guide plate 1 and disposed above the optical film layers 5.

In some embodiments of the present disclosure, the display apparatus further includes a frame 33 disposed at a side of the display module 10 away from the light guide plate 1 and disposed at an outer side of the back plate 2. In other words, an outer side of the display module 10 and the outer side of the back plate 2 are covered by the frame 33, and the frame 33 may further serve to fix the display module 10 and the backlight module 20.

Specific descriptions of the backlight module 20 in the embodiments may refer to the foregoing embodiments, and are not described herein again.

In the display apparatus provided by the embodiments, the thickness of the second light guide portion is greater than the thickness of the first light guide portion, and there is no need for the back plate to adopt a U-shaped structural design, so that the thickness of the backlight module is reduced, thereby reducing the thickness of the display apparatus and reducing the risk that the thickness of the display apparatus exceeds the spec. On the other hand, if the back plate does not adopt the U-shaped structural design, the assembly space may be expanded, so that the assembly of the backlight module is more convenient, thereby improving the assembly efficiency and the yield of the backlight module. In some embodiments of the present disclosure, the light incident side of the second light guide portion is provided with protruding portions, and each light source is disposed between two adjacent protruding portions, that is, each protruding portion is filled between two adjacent light sources, thereby ensuring a light-entry effect of the light guide plate, effectively preventing a hotspot phenomenon due to a too small ratio of A to P of the light source, and protecting the light sources from being squeezed and damaged by the external force. In the description of the embodiments described above, specific features, structures, materials or characteristics may be combined in any suitable manner in any one or more embodiments or examples.

The above embodiments are merely exemplary embodiments employed to explain the principles of the present disclosure, but the present disclosure is not limited thereto. Various modifications and improvements can be made by one person skilled in the art without departing from the spirit and scope of the present disclosure, and such modifications and improvements are also within the scope of the present disclosure. Therefore, the protection scope of the present disclosure shall be subjected to the protection scope of the claims.

What is claimed is:

1. A backlight module, comprising:
   light sources;
   a light guide plate disposed at a side of the light sources, the light guide plate including a second light guide portion disposed adjacent to the light sources and a first light guide portion disposed on a side of the second light portion away from the light sources, a thickness of the second light guide portion being greater than a thickness of the first light guide portion;
   a back plate including a first back plate portion disposed at a side of the light sources away from the light guide plate and a second back plate portion disposed at a side of the light guide plate which is opposite to a light exit side of the light guide plate; and
   a light-shielding strip disposed at the light exit side of the second light guide portion, wherein
   the thickness of the second light guide portion is greater than a thickness of each light source, and
   the light exit side of the second light guide portion is configured to support a display module.

2. The backlight module according to claim 1, further comprising optical film layers, wherein,
   the optical film layers are disposed on a surface of the first light guide portion away from the second back plate portion.

3. The backlight module according to claim 2, wherein a surface of the first light guide portion adjacent to the second back plate portion is flush with a surface of the second light guide portion adjacent to the second back plate portion, and a distance from a surface of the first light guide portion away from the second back plate portion to the surface of the first light guide portion adjacent to the second back plate portion is less than a distance from a surface of the second light guide portion away from the second back plate portion to the surface of the second light guide portion adjacent to the second back plate portion, and wherein,
   a thickness of the optical film layers is less than a distance between the surface of the first light guide portion away from the second back plate portion and the surface of the second light guide portion away from the second back plate portion along a thickness direction of the light guide plate.

4. The backlight module according to claim 1, wherein a difference value between the thickness of the first light guide portion and the thickness of the second light guide portion ranges from 0.05 mm to 0.1 mm.

5. The backlight module according to claim 1, further comprising a plurality of protruding portions extending externally from a surface of the second light guide portion adjacent to the light sources, wherein
   the light sources include a plurality of light-emitting units, and each light-emitting unit is disposed between two adjacent protruding portions.

6. The backlight module according to claim 5, wherein a length of each protruding portion along a direction from the first light guide portion to the second light guide portion is greater than a length of a corresponding light-emitting unit along a direction from the first light guide portion to the second light guide portion.

7. The backlight module according to claim 5, wherein a thickness of each protruding portion is greater than a thickness of each light source.

8. The backlight module according to claim 5, wherein a thickness of each protruding portion is equal to a thickness of the second guide portion.

9. The backlight module according to claim 1, further comprising a plurality of protruding portions disposed on a side of the second light guide portion away from the first light guide portion, wherein
   the light sources are disposed on the side of the second light guide portion away from the first light guide portion, and each light source is disposed between two adjacent protruding portions.

10. The backlight module according to claim 1, wherein a difference value between the thickness of the second light guide portion and the thickness of each light source ranges from 0.05 mm to 0.1 mm.

11. The backlight module according to claim 1, further comprising a circuit board disposed between the second back plate portion, and all of the second light guide portion and the light sources.

12. The backlight module according to claim 11, further comprising a reflective sheet disposed between the first light guide portion and the second back plate portion.

13. The backlight module according to claim 12, further comprising a fixing tape disposed between the circuit board and the reflective sheet, and wherein the fixing tape is connected to the second back plate portion.

14. The backlight module according to claim 13, wherein the fixing tape comprises a portion disposed between the circuit board and the light guide plate at an edge of the circuit board adjacent to the reflective sheet, a portion between the circuit board and the reflective sheet, and a portion between the second back plate portion and the reflective sheet.

15. The backlight module according to claim 1, wherein the light-shielding strip covers the second light guide portion and the light sources.

16. A display apparatus, comprising a display module and the backlight module according to claim 1, wherein
   the display module is disposed on a surface of the light-shielding strip away from the second light guide portion.

17. The display apparatus according to claim 16, wherein the display module is partially disposed at a side of the second light guide portion away from the second back plate portion, and includes an array substrate disposed at a side of the second light guide portion away from the second back plate portion, and a color film substrate disposed on a side of the array substrate away from the array substrate, and wherein the display apparatus further comprises:
a first polarizer disposed on a surface of the color film substrate away from the array substrate, an orthographic projection of the first polarizer on the second back plate portion being overlapped with an orthographic projection of the first light guide portion on the second back plate portion; and
a second polarizer disposed on a surface of the array substrate away from the array substrate, an orthographic projection of the second polarizer on the second back plate portion being overlapped with an orthographic projection of optical film layers on the second back plate portion.

* * * * *